United States Patent [19]

Bergling et al.

[11] Patent Number: 4,763,571
[45] Date of Patent: Aug. 16, 1988

[54] APPARATUS FOR TWO-SIDED COOKING

[75] Inventors: Craig L. Bergling, Chicago; Henry T. Ewald, Schaumburg; Douglas J. Horton, Lombard; James L. Hoverman, Glen Ellyn; Berthold L. Weller, Deerfield, all of Ill.

[73] Assignee: Restaurant Technology, Inc., Oak Brook, Ill.

[21] Appl. No.: 782,963

[22] Filed: Oct. 2, 1985

[51] Int. Cl.⁴ ............................................. A47J 37/06
[52] U.S. Cl. ...................................... 99/349; 99/372; 99/426
[58] Field of Search .................. 99/349, 372, 332, 335, 99/327, 336, 926; 219/524, 525

[56] References Cited

U.S. PATENT DOCUMENTS

| | | |
|---|---|---|
| D. 213,931 | 4/1969 | Bardeau . |
| 992,417 | 5/1911 | Gale . |
| 1,271,796 | 7/1918 | Stivers et al. . |
| 1,512,674 | 10/1924 | Campbell ........................ 99/372 X |
| 1,624,214 | 4/1927 | Cannon .............................. 99/349 |
| 1,659,610 | 2/1928 | Noeth et al. . |
| 1,661,294 | 3/1928 | Lemaster . |
| 1,809,580 | 6/1931 | Carter . |
| 1,881,126 | 10/1932 | Parr . |
| 1,952,763 | 3/1934 | Lux .................................... 99/335 X |
| 1,956,130 | 4/1934 | Neuberger .......................... 99/372 |
| 2,018,698 | 10/1935 | Allen .................................. 99/327 |
| 2,040,676 | 5/1936 | Stevens et al. . |
| 2,174,425 | 9/1939 | Schlumbohm . |
| 2,225,176 | 12/1940 | Lewis et al. . |
| 2,423,963 | 7/1947 | Coffman . |
| 2,520,997 | 9/1950 | Cavanagh ........................... 99/372 |
| 2,522,175 | 9/1950 | Hill . |
| 2,607,287 | 8/1952 | Price .................................. 99/372 |
| 2,632,379 | 3/1953 | Kudo . |
| 2,748,690 | 6/1956 | Lipsich et al. . |
| 2,922,357 | 1/1960 | D'Arcey et al. . |
| 2,939,606 | 6/1960 | Durbin . |
| 3,024,114 | 3/1962 | McConville . |
| 3,064,555 | 11/1962 | Nanna . |
| 3,155,304 | 11/1964 | Beerend . |
| 3,245,462 | 4/1966 | Ramer . |
| 3,312,161 | 4/1967 | Nanna . |
| 3,313,230 | 4/1967 | Simjian . |
| 3,322,113 | 5/1967 | Simjian . |

(List continued on next page.)

FOREIGN PATENT DOCUMENTS

| | | |
|---|---|---|
| 492587 | 3/1978 | Australia . |
| 511593 | 11/1979 | Australia . |
| 596315 | 4/1934 | Fed. Rep. of Germany . |
| 926031 | 4/1955 | Fed. Rep. of Germany . |
| 756826 | 12/1933 | France . |
| 889898 | 10/1943 | France . |
| 935216 | 3/1946 | France . |
| 467612 | 1/1969 | Switzerland . |
| 3387 | of 1883 | United Kingdom .................. 99/372 |
| 20948 | of 1909 | United Kingdom .................. 99/372 |

Primary Examiner—Timothy F. Simone
Attorney, Agent, or Firm—Jenner & Block

[57] ABSTRACT

An apparatus for effecting two-sided cooking of food products, such as frozen hamburger patties, is disclosed which has been configured for highly desirable efficiency, versatility, and consistency in food product preparation. The apparatus includes a housing upon which is mounted a substantially horizontal lower platen assembly, with the apparatus further including one or more upper platen assemblies each mounted on a respective pivotal support arm for movement between a lowered inactive position and a raised active position with respect to the lower platen assembly. The apparatus includes a mounting arrangement for permitting limited relative movement of each upper platen assembly with respect to its support arm, and further includes mechanisms for maintaining a predetermined minimum spacing between the upper and lower platens for avoiding undue compaction of the food products. Automatic controls effect upward movement of the upper platen for precise cooking control.

54 Claims, 2 Drawing Sheets

U.S. PATENT DOCUMENTS

| | | |
|---|---|---|
| 3,427,955 | 2/1969 | Menzin . |
| 3,483,813 | 12/1969 | Noel . |
| 3,493,726 | 2/1970 | Bardeau . |
| 3,620,156 | 11/1971 | Schindler et al. . |
| 3,713,380 | 1/1973 | Bardin . |
| 3,719,507 | 3/1973 | Bardeau . |
| 3,724,711 | 4/1973 | George et al. . |
| 3,779,447 | 12/1973 | Bemiss . |
| 3,794,016 | 2/1974 | Binks et al. . |
| 3,889,582 | 6/1975 | Binks et al. . |
| 3,934,748 | 1/1976 | Racz . |
| 3,942,426 | 3/1976 | Binks et al. . |
| 3,987,718 | 10/1976 | Lang-Ree et al. . |
| 4,012,274 | 3/1977 | Lang-Ree . |
| 4,165,682 | 8/1979 | Weiss . |
| 4,320,699 | 3/1982 | Binks . |
| 4,483,239 | 11/1984 | Mueller et al. . |
| 4,586,428 | 5/1986 | Adamson ............... 99/332 |
| 4,601,237 | 7/1986 | Harter et al. ............ 99/349 |
| 4,669,373 | 6/1987 | Weimer et al. .......... 99/349 |

APPARATUS FOR TWO-SIDED COOKING

TECHNICAL FIELD

The present invention relates generally to cooking grills and like devices, and more particularly to an apparatus for effecting two-sided cooking of meat patties and like food products which has been configured for efficient and consistent food preparation and versatile use.

BACKGROUND OF THE INVENTION

In the commercial food service industry, efficiency and consistency in the preparation of food products are highly desired goals. Efficient preparation lends to customer satisfaction since customers can quickly be served freshly prepared food products that are high in sensory appeal. Customer satisfaction is further enhanced by food preparation techniques which lend themselves to convenient control, since customers can be assured of receiving food products of consistent quality.

One technique for enhancing the efficiency with which food products are prepared concerns heating or cooking the products from two sides simultaneously. In the case of ground meat patties such as hamburgers, sausage, and the like, such two-sided cooking techniques have been found to very substantially decrease the cooking time required when compared with more conventional single-sided grilling or broiling. Nevertheless, attempts to perfect commercially suitable two-sided cooking devices, such as for cooking frozen meat patties, have met with only limited success. In particular, the greatly accelerated cooking achieved with two-sided techniques has been found to greatly affect the criticality of the usual cooking parameters, such as cooking temperatures, cooking times, and the like. Accordingly, the consistency of preparation required by commercial restaurant establishments has heretofore been difficult to achieve when employing two-sided cooking techniques.

Thus, in order to take full advantage of the substantially reduced cooking times that can be achieved with two-sided cooking, a two-sided cooking apparatus must be configured for preparing foods in a consistent and predictable manner. Configuring such an apparatus for use in preparing different food products desirably enhances its versatility. Finally, an arrangement which permits its cooking capacities to be selectively varied as the volume of business may require desirably enhances both the efficiency and versatility of such a device.

SUMMARY OF THE INVENTION

The apparatus embodying the principles of the present invention for effecting two-sided cooking has been configured to permit preparation of substantial quantities of food products, and in particular frozen meat patties, such as required in a commercial restaurant establishment. In this regard, the present apparatus includes a number of features which facilitate highly consistent and predictable product preparation, and which further permit this desired consistency to be maintained even when the device is not operated at its full capacity. Additionally, the present apparatus has been particularly configured to achieve this desired efficiency and consistency when employed for preparing different food products, such as ground meat hamburger patties of differing sizes and weights.

The apparatus of the present invention includes a housing upon which is mounted a lower cooking platen defining a substantially horizontal lower cooking surface. In the preferred form, the lower cooking platen is configured such that its cooking surface is extremely flat, and is further configured to maintain this flatness in use. To this end, the lower platen includes a steel grill plate which defines its cooking surface, and at least one, and preferably a plurality of cast aluminum heating assemblies disposed beneath and against the grill plate. The specific arrangement of the illustrated embodiment has been configured to desirably provide a plurality of independently operable heating "zones", and has further been arranged for rapid heat recovery upon disposition of food products thereon for cooking, thereby abating fluctuations in cooking temperatures for promoting consistency in the cooked products.

The present apparatus further includes at least one, and preferably a pair, of upper cooking platen assemblies. Each upper platen assembly is carried by a respective one of a pair of support arms pivotally mounted on the housing of the apparatus. By this construction, each support arm, and thus each upper platen assembly, is mounted for movement with respect to the housing and the lower cooking platen between a raised, inactive position, and a lowered, active position. In the lowered position, the upper cooking surface defined by the upper cooking platen is brought into confronting, spaced relation with the cooking surface of the lower platen for effecting two-sided cooking of food products therebetween.

One very important feature of the present apparatus concerns the manner in which each upper platen assembly is mounted on its respective support arm. In particular, each upper cooking platen is arranged for "floating" or limited relative vertical movement with respect to its support arm while the upper and lower cooking surfaces are maintained in parallel relation. In this manner, the support arm and platen can be moved into the lowered active position, with the relative vertical movement of the platen with respect to its support arm which is provided permitting the weight of the platen to be exerted against the meat patties for desirably effecting good searing.

While it is desired that the upper cooking platen initially exert substantial weight on the hamburger patties, cooked patties exhibiting the desired sensory appeal are best obtained by relieving this pressure as the patties cook. To this end, the present apparatus is configured such that a minimum predetermined closely controlled parallel spacing is maintained between the upper cooking platen and the cooking surface of the lower platen between which the patties are positioned. In the preferred form, a plurality of selectively adjustable spacing mechanisms are provided for each of the two upper cooking platen assemblies whereby any one of a plurality of differing predetermined minimum spacings can be selected. This arrangement facilitates very convenient conversion of the apparatus for use in cooking patties of differing sizes and weights. Additionally, the illustrated form of these spacing mechanisms is such that each of the minimum predetermined spacings can be very precisely individually adjusted. Again, very consistent food preparation is achieved.

Other features and advantages of the present invention will become readily apparent from the following detailed description, the accompanying drawings, and the appended claims.

DETAILED DESCRIPTION

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Figure 1:
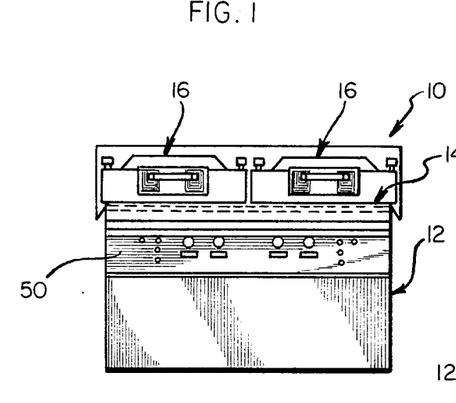
FIG. 1 is a front elevational view of an apparatus for effecting two-sided cooking embodying the principles of the present invention.
Figure 2:
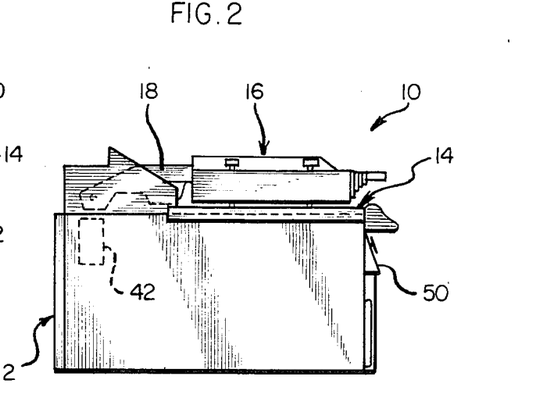
FIG. 2 is a side elevational view of the apparatus illustrated in FIG. 1.

Referring first to FIGS. 1 and 2, therein is illustrated a two-sided cooking apparatus 10 embodying the principles of the present invention. As will further be described in detail, the present apparatus includes a suitable housing assembly 12 for enclosing the internal components of the apparatus, with a lower platen cooking assembly 14 mounted on the housing 12 so that the lower platen provides a substantially horizontal lower cooking surface. The present apparatus further includes at least one, and preferably a pair, of upper platen assemblies 16 respectively carried by a pair of pivotal support arms 18, each of which is pivotally mounted on the housing 12 for movement between a lowered, active position, and a raised, inactive position.

The preferred configuration of lower cooking platen 14 will first be described. Several features of this assembly should be noted since they contribute to the efficiency and consistency of operation of the present apparatus. Lower cooking platen 14 includes a steel grill plate 20 which provides the lower cooking surface of the present apparatus. In the preferred form, grill plate 20 is provided with a precisely machined, extremely flat, substantially planar surface. A Blanchard ground finish is presently preferred. This precisely finished cooking surface acts in cooperation with a similarly extremely flat upper cooking surface provided by each of the upper cooking platen assemblies 16, with the precise finish tolerances of these cooking surfaces contributing to the highly consistent cooking results that can be achieved with the present apparatus.

Figure 3:
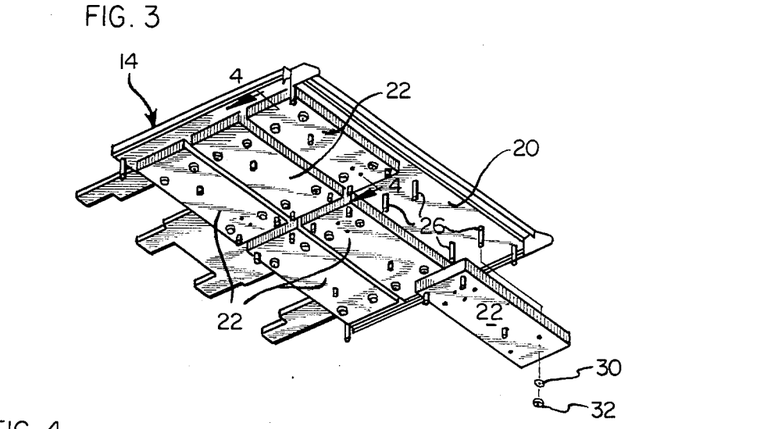
FIG. 3 is a lower perspective, partially exploded view of a lower cooking platen assembly of the cooking apparatus illustrated in FIGS. 1 and 2.
Figure 4:
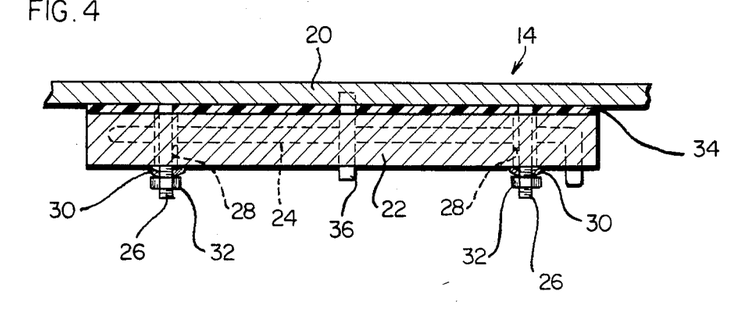
FIG. 4 is a cross-sectional view taken along lines 4—4 of FIG. 3.

As best illustrated in FIG. 3, lower cooking platen 14 further preferably comprises, at least one, and in the preferred form six, cast aluminum heating assemblies 22, each of which includes a cast-in electrical heating element 24 (FIG. 4). In the illustrated embodiment, each of the two sets of three cooking assemblies 22 are arranged for cooperation with a respective one of the upper platen assemblies 16, and are preferably provided with independently operable controls to provide front-to-back heating "zones". This preferred arrangement permits only "half" of the present apparatus to be operated if desired (i.e., three of the heating assemblies 22 and the respective one of the upper platen assemblies 16), and further permits a single one of the heating assemblies 22 to be operated in conjunction with its respective upper platen 16 during periods of low demand, thus desirably contributing to the efficiency of the present apparatus.

The heating assemblies 22 are mounted on grill plate 20 in a manner which promotes thermal efficiency and rapid heat recovery, and which avoids any warpage of the precisely machined grill plate attendant to differential thermal expansion of the grill plate and the heating assemblies. To this end, threaded studs 26 affixed to grill plate 20 are employed for joining each heating assembly 22 to the lower surface of grill plate 20. As shown in FIG. 4, openings 28 defined by each heating assembly 22 through which threaded studs 26 respectively extend are dimensioned to be sufficiently larger than the stud diameter to accommodate the differential thermal expansion which is exhibited by the steel grill plate 20 and each cast aluminum heating assembly 22.

Although such differential thermal expansion is accommodated, it is preferred that each heating assembly 22 be urged toward the bottom of the grill plate 20 for good thermal efficiency. To this end, biasing spring washers (i.e., belleville springs) are preferably provided on each of studs 26 for biasing each heating assembly 22 toward grill plate 20, with nuts 32 threaded onto the studs. Good thermal efficiency is further promoted by the provision of thermally conductive mastic 34 between the grill plate 20 and each heating assembly 22, with the mastic 34 further acting as a "lubricant" to accommodate differential thermal expansion between the heating assemblies and the grill plate. Temperature control is effected through use of a thermocouple 36 for each of heating assemblies 22, with the thermocouple preferably arranged to extend into the portion of grill plate 20 associated with the respective one of heating assemblies 22.

As will be appreciated, the above-described preferred arrangement for lower cooking platen 14 promotes efficiency and versatile use. The "bolt-on" arrangement for securing heating assemblies 22 to grill plate 20 accommodates differential thermal expansion, permits the use of cast aluminum heating assemblies exhibiting high thermal conductivity and rapid heat recovery, and further desirably provides a tough, durable steel cooking surface which can be scraped for cleaning without significant degradation. Of course, while use of lower cooking platen 14 with upper platen assemblies 16 is contemplated, lower platen 14 can be used alone for conventional single-sided cooking.

The upper platen assemblies 16 will now be described, with the understanding that the two upper assemblies are preferably of substantially identical configuration. Accordingly, a single one of the upper assemblies 16 will be described in detail.

As noted, the upper platen assembly 16 is mounted on its respective pivotal support arm 18, with the support arm 18 mounted for pivotal movement with respect to apparatus housing 12 at support arm pivot 40. As will be appreciated, the upper cooking assembly 16 carried by the support arm 18 is sufficiently heavy to make manual, unassisted movement of the cooking assembly between its active and inactive positions burdensome. Accordingly, means are preferably provided for counterbalancing the weight of the upper cooking assembly. In the preferred form, such counterbalancing action is provided by a counterweight 42. Counterweight 42 is operatively connected to the support arm 18 at counterweight pivot 44. Counterweight 42 is preferably sufficiently heavy to move the support arm (and its cooking assembly 16) from the lowered active position upwardly to the raised inactive position, and maintain the support arm and cooking assembly in the raised position. Use of counterweight 42, as opposed to biasing springs or the like, is preferred since it avoids problems of spring fatigue and wear, and further desirably avoids the need for pressurized fluid actuators or like driving means for effecting movement of the upper platen assembly.

Efficient and consistent operation of the present apparatus is promoted by the preferred provision of means for automatically effecting movement of the upper platen assembly 16 from its lower position to its raised position. Since the counterweight 42 acts to urge the support arm 18 and platen assembly 16 upwardly, automatic retaining means are preferably provided for releasably retaining the support arm and platen in their lowered position, with suitable automatic controls provided for automatically releasing the retaining means whereby the support arm and platen move upwardly.

To this end, a retaining mechanism 46 is provided which cooperates with a retaining stop 48 on pivot arm 18, with the retaining mechanism automatically engaged upon movement of support arm 18 to its lowered position by manipulation of handle 49. Automatic controls 50 of the apparatus (FIG. 1) are operatively connected with the retaining mechanism, with the controls including suitable timing devices whereby lowering of the support arm 18 and platen assembly 16 automatically initiates timing of the cooking cycle. Upon conclusion of the pre-set cooking cycle, retaining mechanism 46 is automatically released, whereupon counterweight 42 automatically lifts upper platen assembly 16 to its raised position. Since this arrangement very desirably avoids the need for an operator to manually raise the upper cooking platen for terminating two-sided cooking, efficiency and consistency are promoted. Because of the accelerated cooking action achieved with two-sided cooking, a hamburger patty or other food product can change from a state of being undercooked to overcooked in a matter of seconds. Thus, the automatic control arrangement for automatically releasing the platen and causing the platen to raise desirably acts to avoid the product inconsistencies which can occur attendant to slight variations in cooking times.

Figure 5:
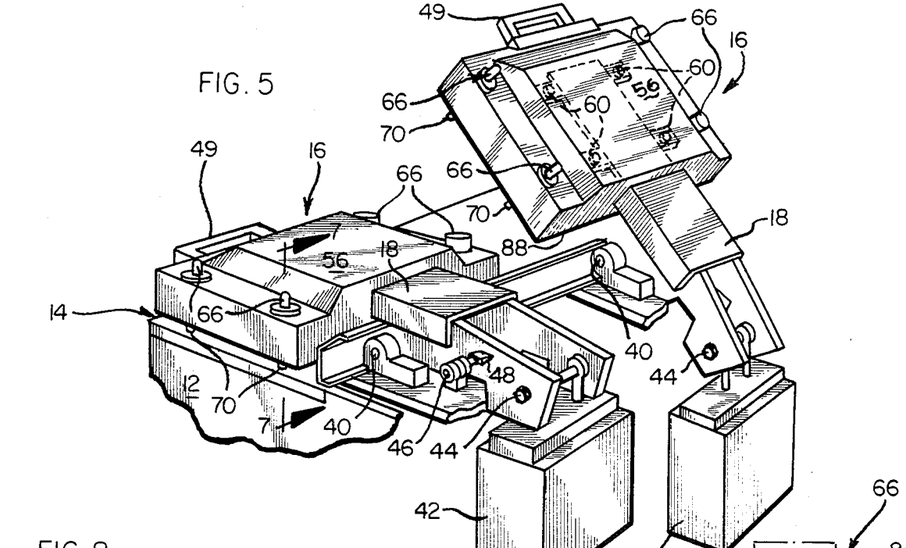
FIG. 5 is a diagrammatic, rear perspective view of the present two-sided cooking apparatus.
Figures 6, 7, 8:
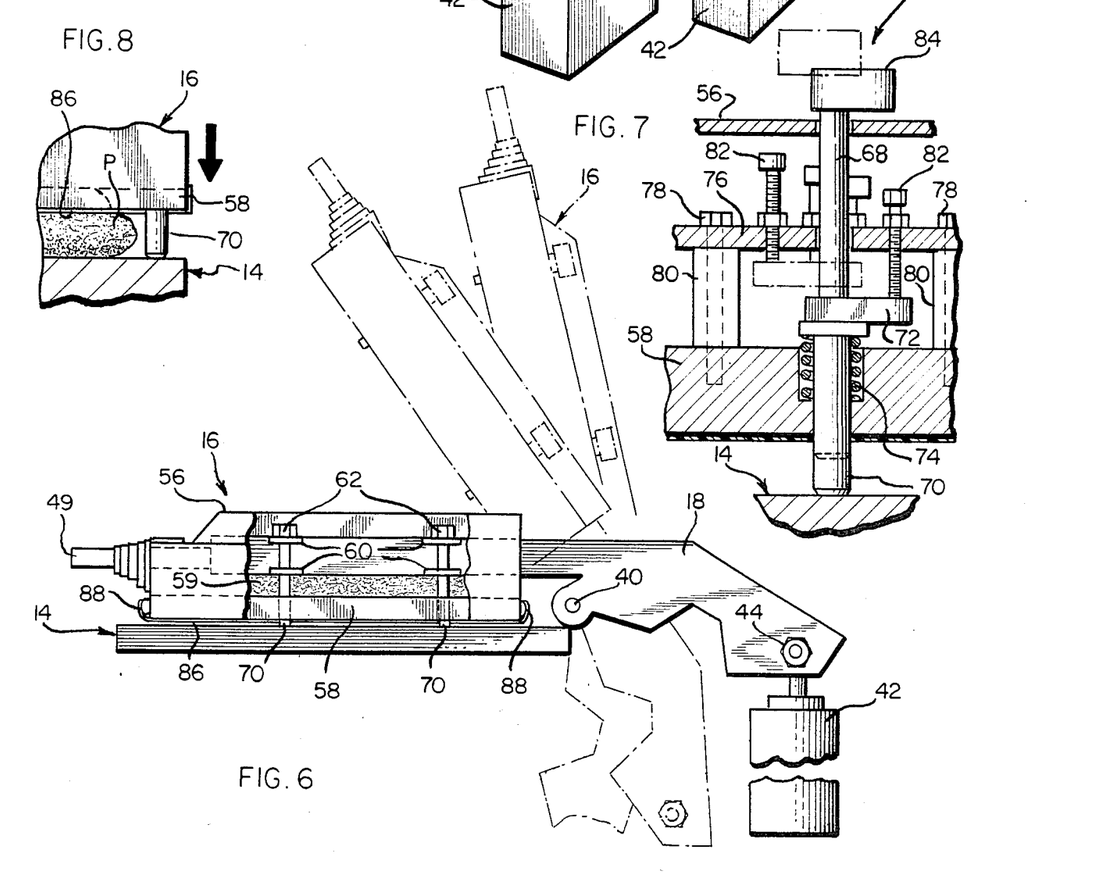
FIG. 6 is a diagrammatic, partial side elevational view, partially cut-away, showing an upper cooking platen assembly of the present apparatus.
FIG. 7 is a cross-sectional view taken along lines 7—7 of FIG. 5 illustrating an adjustable spacing mechanism of the present apparatus.
FIG. 8 is a fragmentary front elevational view diagrammatically illustrating preparation of a ground meat patty with the present cooking apparatus.

The preferred configuration of upper cooking platen assembly 16 will now be described. As best shown in FIGS. 5 and 6, the upper platen assembly 16 includes an outer cover 56 which substantially encloses an upper cooking platen 58 which provides the upper cooking surface of the present apparatus. Thermal insulation 59 is preferably positioned within cover 56 above upper platen 58 to minimize heat loss from the platen. The upper cooking platen 58 preferably comprises a cast-aluminum construction, including a cast-in heating element.

In distinction from the preferred configuration for lower cooking platen 14, the upper cooking platen comprises but a single "zone", which includes its own controls which are operable independently of the lower cooking platen. Like the lower platen, upper platen 58 is preferably provided with a precisely machined, extremely flat lower surface, again for consistency in cooking. As will be further described, a sheet of low-friction material is preferably juxtaposed to the cooking surface of lower platen 58 for contact with the food products during two-sided cooking.

One important feature of the present apparatus concerns the manner in which upper platen assembly 16 is mounted for limited relative vertical movement with respect to its support arm 18 while its cooking surface is arranged in substantially parallel relation to the cooking surface of lower platen 14. In particular, the arrangement is such that support arm 18 can be moved toward its lowered position, with the platen assembly 16 contacting and resting upon patties on the lower cooking platen just before support arm 18 is further moved to its completely lowered position. The upper platen assembly thus initially "floats" upon the patties relative to the support arm and exerts pressure on them for desirably effecting good sear.

This mounting arrangement is provided by a plurality of support ears 60 of the support arm 18 through which extend a plurality of support bolts 62 (four being illustrated, see FIGS. 5 and 6), with the support bolts 62 affixed to upper platen 58. Support bolts 62 are configured for limited movement relative to the respective support ears 60, whereby the entire platen assembly 16 can move upwardly or downwardly slightly with respect to support arm 18 when the support arm is in its fully lowered position. As will be appreciated, this arrangement permits the desired "floating" action while upper platen 58 is maintained in parallel relation to the lower platen 14. As will be recognized, this arrangement is in distinction from previous constructions employing, for example, a pivotal connection between an upper platen and a supporting arm whereby the platen can move about a horizontal axis relative to the arm. Rather, the present construction permits the entire platen assembly 16 (i.e., all portions of the platen assembly) to simultaneously move upwardly or downwardly relative to the support arm 18.

As noted above, it is highly desirable to have the upper platen assembly 16 exert its weight upon hamburger patties positioned on lower platen 14 as the upper platen assembly is initially brought into contact with the patties. This is especially true when preparing frozen patties. However, testing has shown that the sensory appeal of a cooked patty is diminished if the weight of the upper platen assembly 16 is not relieved well prior to completion of the cooking cycle. To this end, the present apparatus is configured such that a predetermined minimum spacing is maintained between the cooking surfaces of the upper platen 58 and lower platen 14.

In the illustrated embodiment, this predetermined minimum spacing is effected by a plurality of adjustable spacing mechanisms 66 (four being illustrated for each upper cooking platen assembly). FIG. 7 illustrates one of the spacing mechanisms 66 in detail. Each mechanism comprises a vertically oriented shaft 68 which extends through and is vertically movable relative to upper platen 58. The vertical shaft 68 terminates in a lower foot portion 70 which is engageable with the lower platen 14.

Vertical shaft 68 is mounted for rotation about its own axis, with each mechanism 66 further including an indexing arm 72 joined to the shaft 68 for rotation therewith. A compression coil biasing spring 74 held captive generally between indexing arm 72 and platen 58 on the shaft 68 urges the shaft 68 upwardly.

The spacing mechanism 66 further includes a detent support plate 76 held in spaced relation above upper platen 58 by bolts 78 and spacers 80. A plurality of detent bolts 82 are threadably mounted on the support plate 76 in circumferentially spaced relation about the rotation axis of shaft 68. A handle 84 mounted on shaft 68 permits its manual movement axially in opposition to spring 74, and further accommodates selective rotation of the shaft.

As illustrated in FIG. 7, the indexing arm 72 is selectively positionable by rotation of shaft 68 for engagement with a selected one of detent bolts 82, with spring 74 urging the indexing arm into engagement with the selected one of the detent bolts. By this arrangement, the distance which foot portion 70 projects beneath the lower surface of upper platen 58 can be selectively and very easily changed. Thus, each of the four spacing mechanisms 66 for the upper platen assembly 16 are adjusted such that corresponding ones of the detent bolts 82 are engaged by the respective indexing arm 72. Thus, the four foot portions 70 project beneath cooking platen 58 by corresponding equal amounts, whereby the desired predetermined minimum spacing between the upper platen and the lower cooking platen 14 is positively maintained, with the upper platen precisely positioned in parallel relation to the lower platen.

As illustrated in FIG. 7, it is presently preferred that each detent bolt 82 be adjustably threadably mounted on support plate 56, with each detent bolt releasably fixed with a lock nut. By this construction, each of the plurality of predetermined spacings provided by each spacing mechanism 66 can be very precisely adjusted.

Cooperation of spacing mechanisms 66 with the floating mounting arrangement of upper platen assembly 16 is diagrammatically illustrated in FIG. 8. FIG. 8 shows, in phantom line, initial contact between the upper platen assembly and a frozen hamburger patty P disposed on lower platen 14. As two-sided cooking commences, the upper platen assembly "floats" downwardly with respect to its associated support arm 18, with the support arm 18 maintained in relatively fixed relation to apparatus housing 12 by its respective retaining mechanism 46. As the frozen patty P thaws and is compressed under the influence of the weight of upper platen assembly 16, the foot portions 70 of the spacing mechanisms 66 move toward and then into engagement with lower platen 14. Engagement of the foot portions 70 with the lower platen thus maintains the desired predetermined minimum spacing and parallelism between the upper platen 58 and the lower cooking platen 14 as the cooking cycle continues, thus desirably avoiding undue compaction of the patty P as it completes cooking.

As noted above, a sheet of low-friction material is preferably juxtaposed to the cooking surface of upper platen 58, thus desirably avoiding adherence of food products being cooked to the upper platen. To this end, a low-friction sheet 86 is preferably provided which comprises a suitable low-friction material such as polytetrafluoroethylene. Removable mounting of low-friction sheet 86 is preferred since such sheet material ordinarily exhibits a limited service life, with removable mounting promoting convenient replacement as well as convenient cleaning of the upper platen assembly. To this end, a mounting arrangement comprising a pair of complementary mounting rails and clips 88 respectively disposed at the forward and rearward edges of upper platen assembly 16 is preferably employed. In the preferred form, the mounting rails are provided with a "dovetail" cross-sectional configuration, with the spring clips fitted thereto likewise provided with such a configuration, whereby an edge of the low-friction sheet 86 can be disposed and releasably retained between each mounting rail and its associated clip.

Thus, a two-sided cooking apparatus has been disclosed configured to provide heretofore unachieved efficiency, consistency, and versatility for preparation of food products, and particularly frozen meat patties such as hamburgers.

From the foregoing, it will be observed that numerous modifications and variations can be effected by those skilled in the art without departing from the true spirit and scope of the novel concept of the present invention. It will be understood that no limitation with respect to the specific apparatus illustrated herein is intended or should be inferred. It is, of course, intended to cover by the appended claims all such modifications as fall within the scope of the claims.

What is claimed is:

1. An apparatus for effecting two-sided cooking of food products, comprising:

a housing;

a lower cooking platen mounted on said housing and defining a substantially horizontal lower cooking surface;

a support arm mounted on said housing for movement between raised inactive and lowered active positions;

an upper cooking platen carried by said support arm for movement therewith between said upper and lower positions, said upper platen defining a generally downwardly facing and substantially flat upper cooking surface;

means mounting said upper platen on said support arm for limited relative vertical movement with respect thereto when said support arm is in said lowered, active position, said mounting means being configured to permit said upper cooking surface to be positioned in substantially parallel relation to said lower cooking surface as said upper platen moves relative to said support arm for effecting two-sided cooking of food products positioned between said cooking surfaces;

means operatively connected to said support arm for moving said support arm from said lowered position to said raised position;

retaining means operatively associated with said support arm for releasably retaining said support arm and said upper platen in said lowered position against the action of said moving means;

control means for selectively operating said retaining means for automatically effecting release of said retaining means whereby said upper platen and said support arm are moved from said lowered position to said upper position by the action of said moving means; and means for maintaining a predetermined minimum spacing between said upper cooking platen and said lower cooking platen when said support arm and said upper platen are in said lowered position, including spacing mechanisms which engage said lower platen to maintain said minimum spacing.

2. A two-sided cooking apparatus in accordance with claim 1, wherein
said means for maintaining said predetermined spacing includes means for selectively adjusting said minimum predetermined spacing to any one of a plurality of differing minimum predetermined spacings.

3. A two-sided cooking apparatus in accordance with claim 2, including
means for selectively adjusting each one of said plurality of differing minimum predetermined spacings.

4. A two-sided cooking apparatus in accordance with claim 1, including
low-friction sheet means juxtaposed to the surface of said upper cooking platen for contact with said food products, and means for releasably securing said low-friction sheet means to said upper cooking platen.

5. A two-sided cooking apparatus in accordance with claim 1, wherein
said lower cooking platen comprises a substantially flat steel grill plate which provides said lower cooking surface, at least one heating assembly comprising an aluminum casting containing an electrical heating element, and means joining said heating assembly to the lower surface of said grill plate for accommodating differential thermal expansion of said grill plate and said heating assembly.

6. A two-sided cooking apparatus in accordance with claim 5, wherein
said joining means comprises a plurality of studs connected to said grill plate and extending through openings defined by said heating assembly, wherein said openings are dimensioned larger than said studs to accommodate relative movement during said differential thermal expansion.

7. A two-sided cooking apparatus in accordance with claim 6, including
means biasing said heating assembly toward said grill plate, and thermally-conductive mastic means disposed between said heating assembly and said grill plate.

8. An apparatus for effecting two-sided cooking of food products, comprising:
a housing;
a lower cooking laten mounted on said housing defining a substantially horizontal lower cooking surface;
a support arm pivotally mounted on said housing for movement between a lowered, active position and a raised, inactive position;
an upper cooking platen carried by said support arm for movement therewith between said lowered and raised positions, said upper platen defining a generally downwardly facing and substantially flat upper cooking surface positionable in spaced, confronting relation to said lower cooking surface when said support arm is in the lowered position;
means mounting said upper platen on said support arm for limited relative vertical movement with respect thereto when said support arm is in said lowered position, said mounting means providing said limited vertical movement but orienting said upper cooking surface of said upper platen in parallel relation to said lower cooking surface in at least one upper platen position;
means for maintaining a predetermined minimum spacing between said upper and lower cooking surfaces when said support arm is in said lowered position, whereby food products can be placed on said lower cooking surface, and said support arm moved from its raised position to its lowered position to thereby bring said upper cooking platen onto the food products for two-sided cooking thereof, said mounting means permitting said upper platen to move downwardly with respect to said support arm after said upper platen rests upon said food products until said maintaining means act to maintain said predetermined minimum spacing between said upper and lower cooking surfaces;
said mounting means including spacing mechanisms which engage said lower platen to maintain said minimum spacing;
counterweight means operatively connected to said pivotally mounted support arm for moving said support arm and said upper platen from said lowered position to said raised position;
retaining means mounted on said housing in operative association with said support arm for releasably retaining said support arm in said lowered position against the action of said counterweight means; and
automatic timer control means for automatically operating said retaining means to release said support arm from said lowered position after a predetermined time period of two-sided cooking.

9. A two-sided cooking apparatus in accordance with claim 8 wherein
said lower cooking platen comprises a grill plate which provides said lower cooking surface, and a plurality of independently operable cast aluminum heating assemblies mounted in juxtaposed relation to the lower surface of said grill plate, including thermally-conductive mastic means between each said heating assembly and said grill plate, and means biasing each said heating assembly toward said grill plate.

10. A two-sided cooking apparatus in accordance with claim 8, including
low-friction sheet means juxtaposed to the upper cooking surface of said upper platen for contact with said food products.

11. A two-sided cooking apparatus in accordance with claim 10, wherein
said maintaining means comprises means for selectively adjusting said minimum predetermined spacing to any one of a plurality of differing minimum predetermined spacings, and means for selectively adjusting each one of said plurality of minimum predetermined spacings.

12. An apparatus for effecting twosided cooking of food products, comprising:
a housing;
a lower cooking platen mounted on said housing and defining a substantially horizontal lower cooking surface;
a support arm pivotally mounted on said apparatus for movement between raised inactive and lowered active positions;
an upper cooking platen carried by said support arm for movement therewith between said upper and lower positions, said upper platen defining a generally downwardly facing upper cooking surface;

means mounting said upper platen on said support arm for limited relative vertical movement with respect thereto when said support arm is in said lowered, active position, said mounting means being configured to permit said upper cooking surface to be positioned in substantially parallel relation to said lower cooking surface when said upper platen is in its lowered active position for effecting two-sided cooking of food products positioned between said cooking surfaces;

means for maintaining a predetermined minimum spacing between said upper cooking platen and said lower cooking platen when said support arm and said upper platen which engage said lower platen to maintain said minimum spacing;

counterbalance means operatively connected to said support arm for moving said support arm from said lowered position to said raised position; and retaining means operatively associated with said support arm for releasably retaining said support arm and said upper platen in said lowered position against the action of said couterbalance means.

13. A two-sided cooking apparatus in accordance with claim 12, including means for maintaining a predetermined minimum spacing between said upper cooking platen and said lower cooking platen when said support arm and said upper platen are in said lowered position.

14. A two-sided cooking apparatus in accordance with claim 13, wherein said means for maintaining said predetermined spacing includes means for selectively adjusting said minimum predetermined spacing to any one of a plurality of differing minimum predetermined spacings.

15. A two-sided cooking apparatus in accordance with claim 14, including means for selectively adjusting each one of said plurality of differing minimum predetermined spacings.

16. An apparatus for effecting two-sided cooking of food products, comprising:

a housing;

a lower cooking platen mounted on said apparatus and defining a substantially horizontal lower cooking surface;

a support arm pivotally mounted on said housing for movement between a lowered, active position and a raised, inactive position;

an upper cooking platen carried by said support arm for movement therewith between said lowered and raised positions, said upper platen defining a generally downwardly facing and substantially flat upper cooking surface positionable in spaced, confronting relation to said lower cooking surface when said support arm is in the lowered position;

means mounting said upper platen on said support arm for limited relative vertical movement with respect thereto when said support arm is in said lowered position, said mounting means providing said limited vertical movement but permitting said upper cooking surface of said upper platen to be located in parallel relation to said lower cooking surface;

means for maintaining a predetermined minimum spacing between said upper and lower cooking surfaces when said support arm is in said lowered position, whereby food products can be placed on said lower cooking surface, and said support arm moved from its raised position to its lowered position to thereby bring said upper cooking platen onto the food products for two-sided cooking thereof, said mounting means permitting said upper plated to move downwardly with respect to said support arm after said upper platen rests upon said food products until said maintaining means act to maintain said predetermined minimum spacing between said upper and lower cooking surfaces;

said lower cooking platen comprising a grill plate which provides said lower cooking surface;

and a plurality of independently operable heating assemblies mounted in juxtaposed relation to the lower surface of said grill plate, including thermally-conductive mastic means between each said heating assembly and said grill plate, and means biasing each said heating assembly toward said grill plate for providing independently operable heating zones over corresponding portions of the grill plate.

17. A two-sided cooking apparatus in accordance with claim 16 including a plurality of studs connected to said grill plate and extending through openings defined by said heating assemblies, wherein said openings are dimensioned larger than said studs to accomodate relative movement during differential thermal expansions.

18. An apparatus for effecting twosided cooking of food products, comprising:

a lower cooking platen defining a substantially horizontal lower cooking surface;

an upper cooking platen defining a generally downwardly facing and substantially flat upper cooking surface;

a support member on which said upper platen is carried and movable between a raised inactive position and a lowered active position in which the upper cooking surface is generally parallel to said lower cooking surface;

a floating mounting means connecting said upper platen to said support member for limited relative vertical movement of said upper platen with respect to said support member when said support member is in said active position to permit the entire upper platen to move simultaneously upwardly or downwardly relative to the support member; and means for maintaining a predetermined minimum spacing between said upper cooking platen and said lower cooking platen when said support member and said upper platen are in said lowered position, including spacing mechanisms which engage said lower platen to maintain said minimum spacing.

19. The apparatus according to claim 18, further comprising retaining means operatively associated with said support member for releasably retaining said support member in said active position.

20. The apparatus according to claim 18, wherein said upper platen is capable of said limited movement between a first cooking position with said upper platen resting at least initially on said food product and a second cooking position at a predetermined minimum spacing of said upper platen closer to said lower platen than in the first cooking position.

21. The apparatus according to claim 18 including a plurality of adjustable spacing mechanisms located on said upper platen for selecting different minimum spacings of the upper platen away from the lower platen, each mechanism having a plurality of individually selectable means to define different minimum spacings.

22. The apparatus according to claim 21 in which each of said mechanisms each comprise a vertically oriented shaft which extends through and is vertically movable relative to said upper platen, said vertical shaft terminating in a lower foot portion which abuts said lower platen.

23. An apparatus for effecting two-sided cooking of food products comprising:
- a lower cooking platen formed of a material which defined a substantially horizontal lower cooking surface;
- an upper cooking platen defining a generally downwardly facing and substantially flat upper cooking surface constructed of a different material than said lower cooking surface and having a high thermal conductivity;
- a low-friction sheet releasably mounted to said upper cooking surface of said upper platen;
- support means for carrying said upper platen between an inactive position away from said lower platen an active position toward said lower platen to effect two-sided cooking of food products positioned therebetween; and
- a floating means for mounting said upper platen for limited relative vertical movement about the support means when in the active position.

24. The apparatus according to claim 23 wherein said material for the lower cooking surface comprises steel and said material for the upper platen comprises aluminum.

25. The apparatus according to claim 24 in which said upper platen further includes a cast-in heating element.

26. The apparatus according to claim 23 wherein said means for releasably mounting said low-friction sheet comprises a plurality of complementary mounting rails and clips respectively disposed at the foreward and rearward edge of said upper platen.

27. The apparatus according to claim 26 wherein said mounting rails are provided with a dovetail cross-sectional configuration and said clips fitted thereto are provided with a dovetail cross-sectional configuration, whereby an edge of said low-friction sheet can be disposed and releasably mounted between each said mounting rail and its said associated clip.

28. An apparatus for effecting two-sided cooking of food products comprising:
- a lower grill plate which provides a top cooking surface and a bottow mounting surface; an upper cooking platen carried by a support member between a raised inactive position and a lowered active position in which the food product being cooked is between the upper platen and the top cooking surface of the lower grill plate; a plurality of independently operable heating assemblies located in juxtaposed relation to the bottom surface of said lower grill plate; means for mounting each said heating assembly toward said bottom surface; and thermally-conductive mastic between said heating assemblies and said bottom surface.

29. The apparatus according to cliam 28, wherein said heating assemblies are contsucted from a material that exhibits higher thermal conductivity than the material of the lower grill plate.

30. The apparatus according to claim 29, wherein said heating assemblies are constructed from cast aluminum and said lower grill plate is constructed of steel.

31. The apparatus according to claim 28, wherein said means for mounting comprise studs attached to the bottom surface for biasing each said heating assembly against the bottom surface of the lower grill plate.

32. The apparatus according to claim 28, including means for controlling temperature of said heating assemblies with at least one thermocouple arranged to extend through one heating assembly and into a portion of said lower grill plate associated with said one heating assembly.

33. An apparatus for effecting two-sided cooking of food products, comprising:
- a lower cooking platen defining a substantially horizontal lower cooking surface;
- an upper cooking platen defining a generally downwardly facing and substantially flat upper cooking surface;
- a support member on which said upper platen is carried and movable between a raised inactive position and a lowered active position in which the upper cooking surface is generally parallel to said lower cooking surface;
- mounting means for limited vertical movement of the upper platen relative to the support member when in the lowered active position; and
- a plurality of adjustable spacing mechanisms located on the upper platen eand each including a shaft movable to different positions to establish different minimum spacings between the upper platen and the lower platen, a stop, and a plurality of detent bolts of different effective lengths which can be individually selected to abut the stop to establish corresponding movement for the shaft to thereby set the different minimum spacings.

34. The apparatus according to claim 33 wherein the plurality of detent bolts are threadably mounted to a support plate to allow precise adjustment of the length thereof.

35. The apparatus according to claim 33 including a handle extending above the upper platen and mounted for movement axially and rotatably by an operator, the axial movement disengaging one of the detent bolts from the stop and the rotatably movement causing a different one of the detent bolts to engage the stop to thereby change the minimum spacing.

36. The apparatus according to claim 33 in which the ends of each shaft extends downwardly and terminates in a foot portion which rests on the lower platen to define the minimum spacing.

37. An apparatus for effecting two-sided cooking of food products, comprising:
- a lower cooking platen defining a substantially horizontal lower cooking surface;
- an upper cooking platen defining a generally downwardly facing and substantially flat upper cooking surface;
- a support arm having a front portion and a rear portion with an arm pivot located between said portions for pivoting motion of the arm about the arm pivot;
- mounting means for mounting the upper cooking platen to the front portion of the support arm; and
- a counterweight connected to a counterweight pivot separate from the arm pivot and located in the rear portion of the support arm to thereby rotate the upper platen upward to an inactive position away from the lower platen.

38. The apparatus according to claim 37 wherein the support arm includes a retaining stop, and a retaining mechanism for engaging the retaining stop to hold the support arm and thereby the upper platen in an active position adjacent the lower platen.

39. The apparatus according to claim 37 wherein the mounting means includes a floating mechanism for limited relative vertical movement of the upper platen with respect to the front portion of the support arm to permit the entire upper platen to move simultaneously upwardly or downwardly relative to the front portion of the support arm.

40. The apparatus according to claim 37 wherein the counterweight is of a sufficient weight to maintain the upper platen in the inactive position once the upper platen has been rotated into the inactive position.

41. An apparatus for effecting two-sided cooking of food products, comprising:
   a lower cooking platen defining a substantially horizontal lower cooking surface;
   an upper cooking platen defining a generally downwardly facing and substantially flat upper cooking surface;
   a support member on which said upper platen is carried and movable between a raised inactive position and a lowered active position in which the upper cooking surface is generally parallel to said lower cooking surface;
   means for mounting said upper platen on said support arm for limited relative vertical movement with respect thereto when said support arm is in said lowered, active position for effecting two-sided cooking of food products positioned between said cooking surfaces; and
   means for maintaining a predetermined minimum spacing between said upper cooking platen and said lower cooking platen when said support member and said upper platen are in said lowered position, including spacing mechanisms which engage said lower platen to maintain said minimum spacing.

42. The apparatus according to claim 41 including:
   counterbalance means operatively connected to said support member for moving said support member from said lowered position to said raised position; and
   retaining means operatively associated with said support member for releasably retaining said support member in said lowered position against the action of said counterbalance means.

43. The apparatus according to claim 41, wherein said means for maintaining said predetermined minimum spacing includes means for selectively adjusting said minimum predetermined spacing to any one of a plurality of differing minimum predetermined spacings.

44. The apparatus according to claim 41, further including
   spacing control means located on the exterior of said upper cooking platen for selectively adjusting each one of said plurality of differing minimum predetermined spacings.

45. An apparatus for effecting two-sided cooking of food products comprising:
   a lower cooking platen defining a substantially horizontal lower cooking surface;
   an upper cooking platen defining a generally downwardly facing and substantially flat upper cooking surface;
   a support member on which said upper platen is carried and movable between a raised inactive position and a lowered active position in which the upper cooking surface is generally parallel to said lower cooking surface;
   means for mounting said upper platen on said support member for limited relative vertical movement with respect thereto when said support member is in said lowered, active position for effecting two-sided cooking of food products positioned between said cooking surfaces;
   means for maintaining a predetermined minimum spacing between said upper cooking platen and said lower cooking platen when said support member and said upper platen are in said lowered position; and
   spacing control means located on the exterior of said upper cooking platen and connected to said minimum spacing means for selectively adjusting said predetermined minimum spacing to any one of a plurality of differing minimum spacings.

46. The apparatus according to claim 45, including:
   counterbalance means operatively connected to said support member for moving said support member from said lowered position to said raised position; and
   retaining means operatively associated with said support member for releasably retaining said support member in said lowered position against the action of said counter-balance means.

47. The apparatus according to claim 45 wherein the spacing control means comprises a shaft which is movable to different positions along its longitudinal axis to select the differing minimum spacings.

48. The apparatus according to claim 47 wherein the shaft terminates in a lower foot portion that is engageable with the lower platen.

49. The apparatus according to claim 45 wherein the spacing control means comprises a shaft movable to different positions to establish different minimum spacings between the upper platen and the lower platen, a stop, and a plurality of detents of different effective lengths which can be individually selected to abut the stop to establish corresponding movement for the shaft to thereby set the different minimum spacings.

50. The apparatus according to claim 49 wherein the shaft terminates in a lower foot portion that is engageable with the lower platen.

51. The apparatus according to claim 49 wherein the stop comprises an indexing arm mounted onto the shaft, the indexing arm being moved into abutment with the selected one of the detents.

52. The apparatus according to claim 51 further comprising a biasing spring held captive generally between the indexing arm and the upper platen for urging the indexing arm into engagement with the selected one of the detents.

53. The apparatus according to claim 49 wherein the detents comprise bolts threadably mounted onto a support plate, each detent bolt being releasably fixed.

54. The apparatus according to claim 45 wherein each spacing control means is used to adjust a separate minimum spacing means.

* * * * *

UNITED STATES PATENT AND TRADEMARK OFFICE
CERTIFICATE OF CORRECTION

PATENT NO. : 4,763,571

DATED : August 16, 1988

INVENTOR(S) : Craig L. Bergling, et al.

It is certified that error appears in the above-identified patent and that said Letters Patent is hereby corrected as shown below:

Column 8, line 14, change "conf gured" to --configured--.
Column 10, line 56, change "twosided" to --two-sided--.
Column 11, line 14, after "upper platen" insert --are in said lowered position, including spacing mechanisms--; line 22, change "couterbalance" to --counterbalance. Column 12, line 6, change "plated" to --platen--; line 26, change "accomodate" to --accommodate--; line 28, change "twosided" to --two-sided--.
Column 13, line 13, change "defined" to --defines--; line 24, change "an" (second occurrence) to --and--; line 40, change "foreward" to --forward--; line 52, change "bottow" to --bottom--; line 65, change "cliam" to --claim--; line 66, change "contsucted" to --constructed--. Column 14, line 30, change "eand" to --and--; line 46, change "rotatably" to --rotatable--. Column 16, line 34, change "counter-balance" to --counterbalance--.

Signed and Sealed this

Thirty-first Day of January, 1989

Attest:

DONALD J. QUIGG

Attesting Officer

Commissioner of Patents and Trademarks